United States Patent

[11] 3,613,105

[72] Inventor Ernest C. Freeland
Huntingdon Valley, Pa.

[21] Appl. No. 35,730
[22] Filed May 8, 1970
[45] Patented Oct. 12, 1971
[73] Assignee Philco Ford Corporation
Philadelphia, Pa.

[54] COLOR MATRIX CIRCUIT
6 Claims, 4 Drawing Figs.

[52] U.S. Cl. ........ 178/5.4 MA
[51] Int. Cl. ........ H04n 9/52
[50] Field of Search ........ 178/5.4 MA, 5.4 SD

[56] References Cited

UNITED STATES PATENTS 3,270,126 8/1966 Crookshanks et al. ....... 178/5.4 MA

*Primary Examiner*—Robert L. Richardson
*Attorney*—Herbert Epstein

ABSTRACT: A matrix circuit for supplying drive signals to each of the three color guns in the picture tube of a color television receiver.

The circuit comprises three amplifying stages for supplying R–Y, G–Y, and B–Y picture tube drive signals. A portion of the R–Y output signal is supplied from the plate of the R–Y amplifier to the grid of the G–Y amplifier by a nonlinear voltage divider. Portions of each of the R–Y, G–Y, and B–Y output signals are supplied to each of the other amplifiers by means of a cathode degenerating resistor common to all three amplifiers. Additional resistance is provided in the cathode circuit of the B–Y amplifier and in the circuit common to the cathodes of the B–Y and G–Y amplifiers to adjust the relative gains of the three amplifiers and the relative portions of the R–Y, G–Y, and B–Y signals coupled to each of the amplifiers.

INVENTOR.
ERNEST C. FREELAND

INVENTOR.
ERNEST C. FREELAND

COLOR MATRIX CIRCUIT

BACKGROUND OF THE INVENTION

This invention relates to a color television receiver and more particularly to an improved matrix circuit for deriving the color component signals for application to he cathode-ray tube color guns.

Prior art color television matrix circuits have been designed to provide to the color picture tube, signals faithfully representative of the received color signal. However due to variations in studio lighting and color balance of the television camera, the picture which results from a faithful reproduction of the received signal is not necessarily the picture most pleasing to viewers.

In particular, the viewer is most acutely aware of errors in flesh tones and the greens of grass, and less perceptive of errors in other parts of the color spectrum. Prior art receivers have attempted to take advantage of this and provide a picture more pleasing to viewers by reproducing as flesh tones even those received color signals representative of colors slightly removed from flesh tones. For example a signal representative of red or yellow is reproduced to look more like orange, and a signal representative of greenish-yellow is reproduced to look more yellow. However, these prior art circuits suffer from the disadvantage that other colors not near the flesh tones are not faithfully reproduced. For example red, magenta, and blue are reproduced as pastel shades, and green is reproduced looking more like cyan.

Accordingly, an object of this invention is to provide an improved color matrix circuit for color television receivers.

Another object is to provide a color matrix circuit which decreases sensitivity of the receiver to changes in color near the flesh tones while providing faithful reproduction of the other colors.

DRAWING

DESCRIPTION OF THE CIRCUIT functions

Figure 1:
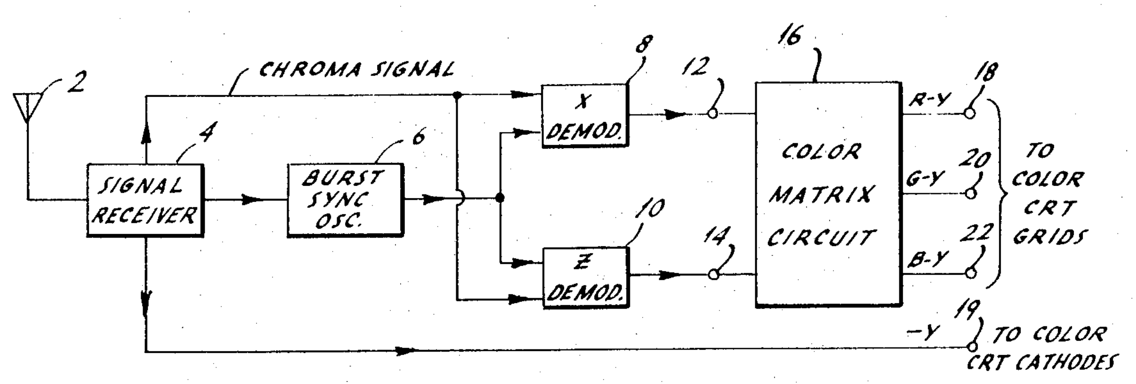
FIG. 1 is a block diagram of color television receiver components associated with the circuit according to the invention.

Referring to FIG. 1, the incoming television signal is received at antenna 2 and is applied to signal receiver 4, which performs, inter alia, the functions of R.F. amplification, heterodyning, I.F. amplification, synchronization-signal separation, including separation of the burst synchronization signal, chroma signal separation and development of the luminance (Y) signal. Signal receiver 4 drives burst synchronization oscillator 6 which provides a locally generated signal accurately synchronized with the master oscillator of the color television transmitter. The output signal of burst synchronization oscillator 6, and the chroma signal supplied by receiver 4, drive X demodulator 8 and Z demodulator 10. Those demodulators respectively provide X and Z reference signals to color matrix circuit 16 at terminals 12 and 14 respectively. Color matrix circuit 16, which has a structure in accordance with the invention, supplies (R–Y), (G–Y), and (B–Y) drive signals at terminals 18, 20, and 22, respectively. Conventionally those signals are supplied to the respective control grids of the red, green and blue electron guns of the picture tube (not shown). In addition, receiver 4 supplies the negative of the Y (luminance) signal at terminal 19. Conveniently this negative of the Y signal is supplied to the cathodes of the picture tube.

Figure 2:
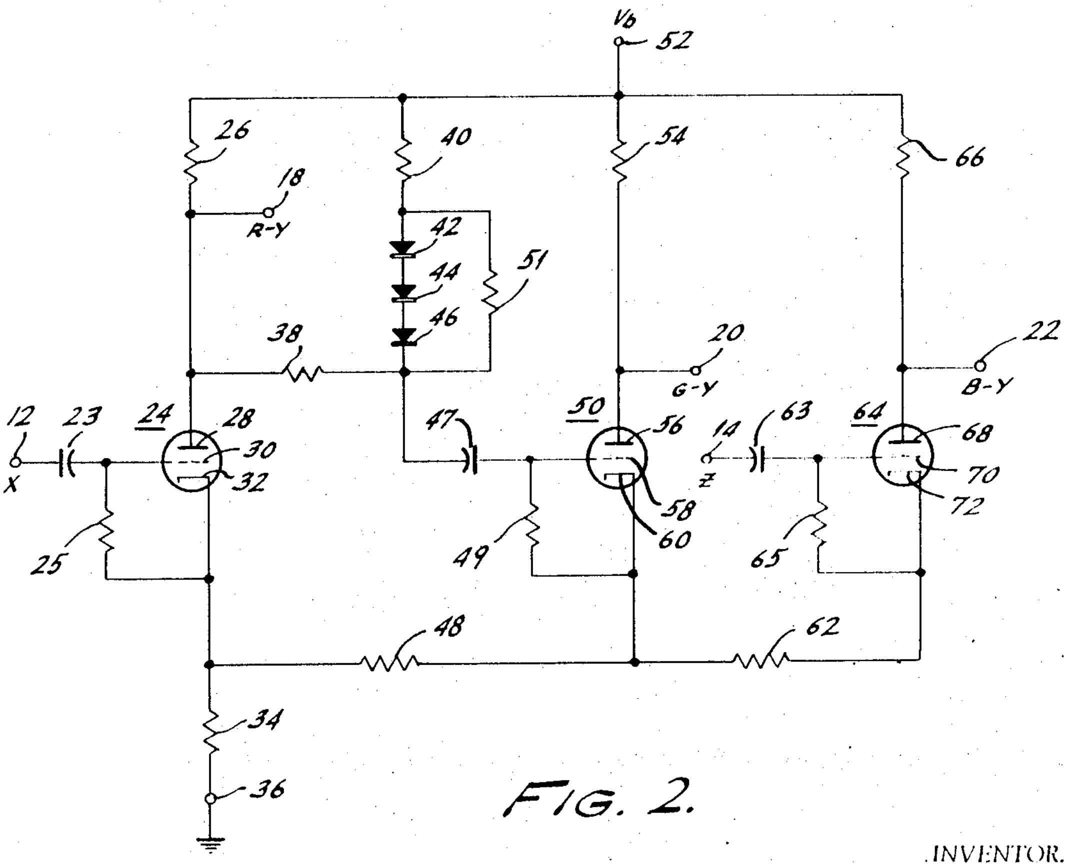
FIG. 2 is a schematic diagram of a color matrix circuit according to the invention.

As shown in FIG. 2, the color matrix circuit according to the invention comprises three amplifying stages 24, 50, and 64, for supplying the R–Y, G–Y, and B–Y signals at output terminals 18, 20, and 22 respectively, in response to the X and Z reference signals applied to input terminals 12 and 14 respectively.

The X reference signal 12 is supplied to grid 30 of R–Y amplifier tube 24 via DC blocking capacitor 23. Plate 28 of R–Y amplifier 24 is connected by load , 26 to a source of positive bias voltage $V_b$ at supply terminal 52. Cathode 32 of R–Y amplifier 24 is connected to a terminal at reference potential 36 by feedback resistor 34, and to grid 30 by grid leak resistor 25.

A resistor 38, diodes 42, 44, nd 46 and a resistor 40 form a nonlinear voltage divider network for supplying a portion of the R–Y output signal at terminal 18 to the grid 58 of G–Y amplifier 50. Plate 28 of R–Y amplifier 24 is coupled to grid 58 of G–Y amplifier 50 by the series combination of resistor 38 and DC blocking capacitor 47. The junction between resistor 38 and DC blocking capacitor 47 is connected to supply terminal 52 by the series combination of diodes 46, 44, 42 and resistor 40. Diode characteristic shaping resistor 51 is connected in shunt with the series combination of diodes 42, 44, and 46.

Plate 56 of G–Y amplifier 50 is connected directly to G–Y output terminal 20 and is also connected to supply terminal 52 by load resistor 54. Cathode 60 of G–Y amplifier 50 is connected to cathode 32 of R–Y amplifier 24 by feedback resistor 48, and to grid 58 of G–Y amplifier 50 by grid leak resistor 49.

The Z reference signal 14 is supplied to grid 70 of B–Y amplifier 64 by DC blocking capacitor 63. Plate 68 of B–Y amplifier 64 is connected directly to B–Y output terminal 22 and is also connected to supply terminal 52 by load resistor 66. Cathode 72 of B–Y amplifier 64 is connected to cathode 60 of G–Y amplifier 50 by feedback resistor 62 and to grid 70 of B–Y amplifier 64 by grid leak resistor 65.

Exemplary tubes, diodes, and component and voltage values are listed in the following tabulation. However, different tubes and diodes, and components and voltages having different values, can also be used.

TABLE I

Exemplary Voltages, Component Values, and Tube and Diode Types

| | | |
|---|---|---|
| Voltage | $V_b$ | +300 volts DC |
| Tubes | 24, 50 and 64 | Triode section of type 6BL8, each |
| Diodes | 42, 44 and 46 | Type 1N60D, each |
| Capacitors | 23, 47 and 63 | 0.033 microfarad, each |
| Resistors | 25...1 megohm | |
| | 26...18 kilohms | |
| | 34...240 ohms | |
| | 38...82 kilohms | |
| | 40...1.5 kilohms | |
| | 48...150 ohms | |
| | 49...1 megohm | |
| | 51...4.7 kilohms | |
| | 54...15 kilohms | |
| | 62...68 ohms | |
| | 65...1 megohm | |
| | 66...15 kilohms | |

CIRCUIT OPERATION

As aforementioned, the chroma signal, containing color information, and the burst signal, consisting of approximately eight cycles of the color carrier, are extracted from the transmitted television signal by signal receiver 4. The burst signal is applied to burst synchronization signal oscillator 6 which provides, in the receiver, a reference signal synchronized to the transmitted color carrier.

The reference signal and the chroma signal are then applied to demodulators 8 and 10, where the X and Z color signals to be applied to color matrix circuit 16 are generated. The respective phases of the chroma signal for which the X and Z output signals have their maximum amplitudes can be established by adjusting the phases of the respective reference signals supplied by burst synchronization oscillator 6 to each demodulator 8 and 10. Demodulators, as well as appropriate phase shifters for the reference signals, suitable for producing the X and Z signals in response to the reference and chroma signals, are described in U.S. Pat. No. 2,830,112 of D. H. Pritchard, issued on Apr. 8, 1958, and entitled "Color Television."

The prior art teaches that three color difference signals, R–Y, G–Y, and B–Y can be obtained from X and Z signals by means of three vacuum-tube amplifying stages having their cathodes coupled through a common cathode resistor, nd also having the R–Y amplifier output coupled to the G–Y amplifier control grid. This prior art circuit differs from the color matrix circuit of FIG. 2 in that the prior art circuit omits resistors 48, 51 and 62 and diodes 42, 44, and 46. Thus in the prior art circuit, a low-resistance connection joins resistor 38 to resistor 40, and another low-resistance connection joins cathodes 32, 60 and 72. For reasons set forth hereinafter, improved color reproduction is achieved by inclusion, in accordance with the invention, of resistors 48, 51 and 62 and diodes 42, 44 and 46.

For faithful reproduction of the transmitted color signal, the X and Z signals heretofore were generated so as to be representable by vectors (not shown) angled at approximately 70° with respect to each other, and the values of resistors 34, 38 and 40 were chosen so that the matrixing circuit typically provided, in response to the X and Z signals, an R–Y signal 90° lagging in phase with respect to the burst signal, a B–Y signal 180° out of phase with respect to the burst signal, and G–Y signal approximately 57° leading with respect to the burst signal. This method of operation, because it faithfully reproduces the transmitted signal, often produces flesh tones (as well as other colors) displeasing to the viewer. This occurs because the color signals transmitted by a television station often do not represent faithfully the colors viewed by its cameras. As explained hereinafter, in accordance with the invention, a novel matrixing circuit is provided which distorts the colors represented by the received color signals to afford a pleasing color television picture.

Figure 3:
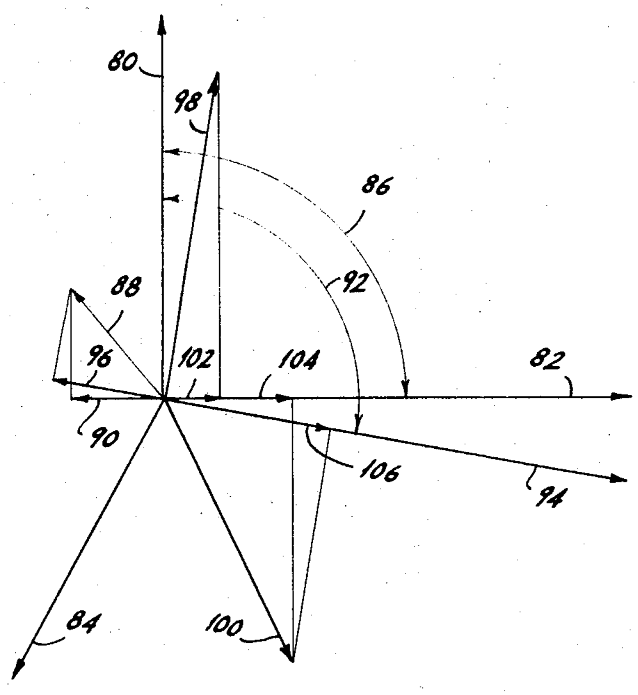
FIG. 3 is a vector diagram showing the effect on flesh tones of the angle of the vectors representative of the R–Y and B–Y signals.

FIG. 3 is a vector diagram showing the effect on flesh tones of the angle between the vectors respectively representative of the R–Y and B–Y signals. Vector 80, representative of the R–Y signal, is shown at an angle of 90° lagging with respect to the burst signal. (The vector for that signal, not shown in FIG. 3, has the same direction as vector 90 discussed hereinafter.) Vector 82, representative of the B–Y signal, is shown at an angle of 180° with respect to the burst signal. Vector 84, representative of the G–Y signal, is shown at an angle of approximately 57° leading with respect to the burst signal. The angle between the R–Y and B–Y vectors, 80 and 82, is therefore 90° as indicated by arc 86.

A signal and of a typical face tone is represented by vector 88. The amplitude of this vector is small, indicating that the saturation of the color to which vector 88 corresponds is low. As a result, vector 88, when resolved along lines coincident with vectors 80, 82 and 84 (the R–Y, B–Y and G–Y axes), produces only small components. The signals corresponding to those small components, being of small amplitude, will modify the respective beam currents of the picture tube by only small amounts. Hence the white light produced by the picture tube in the absence of any R–Y, B–Y and G–Y signals will be modified only slightly to produce the low-saturation flesh tones. Because the human eye is very sensitive to slight changes in colors in the vicinity of flesh tones, slight variations in the lengths of the three components readily are directed by the viewer as changes in viewed color.

Vector 90, the projection of vector 88 on a line through the B–Y vector 82, shows the amount of B–Y signal required to be added algebraically to the Y signal to produce the blue component of the flesh tone 88. Since the sense of vector 90 is opposite that of B–Y vector 82, vector 90 represents a voltage to be subtracted from the Y or luminance signal. Because of this subtraction the picture tube produces less blue light.

A more pleasing picture is produced, with respect to the flesh tones therein, by increasing the angle between the R–Y and B–Y vectors 80 and 82 to values greater than 90°. The reason for this is as follows. If the B–Y signal is shifted so as now to be represented by vector 94, the angle between the R–Y vector 80 and the new B–Y vector 94 is increased as illustrated by the arc 92. Under these conditions, the projection of flesh tone vector 88 upon a line coincident with the new B–Y vector 94 is vector 96. Since vector 96 is larger than vector 90, although also in a sense opposite that of the B–Y vector, a larger (B–Y) voltage will be subtracted from the luminance signal, reducing still further the amount of blue light emitted by the picture tube. As a result a face which, as represented by the received signal, is purplish, will now appear pinkish on the screen of the picture tube, while faces whose flesh tones are represented by the received signal are normal will not change noticeably in color.

Although increasing the angle between the R–Y and B–Y vectors produces more pleasing flesh tones in the reproduced color television picture, it also introduces undesired distortions in other reproduced colors. More particularly, under these conditions, color signals representative of greens are reproduced as bluish greens and color signals representative of magentas are shifted toward red. The shift of greens in the televised image to bluish greens in the reproduced picture is particularly disturbing to viewers because of their familiarity with the color of grass.

The reason for this distortion in imaged colors may be understood by further reference to FIG. 3. In that figure vectors 98 and 100 represent a magenta and a cyan respectively. For convenience, vector 98 is chosen as one in quadrature with the new B–Y vector 94. Under these conditions, vector 98 has no component lying along the B–Y axis. Therefore no B–Y signal is added algebraically to the Y signal and hence no change is made in the intensity of blue light emitted by the picture tube. In contrast, when the B–Y vector was in quadrature with R–Y vector 80, i.e. the B–Y vector was represented by vector 82, the magenta vector 98 had a component 102 lying along the latter B–Y axis. Hence, under those conditions, the amount of blue light emitted by the picture was increased by that component. Since such an increased amount of blue light is needed to reproduce faithfully the magenta represented by the signal which vector 98 represents, the absence of an increase in the blue light, occurring where the B–Y vector is 94, causes the reproduced color to be more reddish than magenta.

Considering the vector 100 representative of the cyan signal, it will be noted that its component 104 along the old B–Y axis 82 is shorter than its component 106 along the new B–Y axis 94. Hence, when new axis 94 is employed, the reproduced color is more bluish than the cyan in the televised image.

The color matrix circuit of the invention provides to the picture tube R–Y, B–Y and G–Y signals which produce faithful reproduction of greens while simultaneously producing more pleasing flesh tones. The more pleasing flesh tones are produced by generating R–Y and B–Y signals along axes whose angle of intersection exceeds 90°; the greens are faithfully reproduced by increasing the magnitude of the G–Y signal by an amount which compensates for the increase in the magnitude of the B–Y signal caused by the B–Y axis being at an angle greater than quadrature with respect to the R–Y axis. The angle between the vectors representing the R–Y and B–Y signals generated by the system of FIG. 2 is established by adjusting in well-known manner the respective phase angles of the reference signals employed in X demodulator 8 and Z demodulator 10. The amplitude of the G–Y signal is established by controlling in accordance with the invention the respective amplitudes of the signals applied to grid 58 and cathode 60 of G–Y amplifier 50.

More particularly, since the grid and cathode signals of tube 50 are supplied by tubes 24 and 64, and since the latter tubes are driven respectively by the X and Z signals, components of both the X and Z signals are applied to tube 50. Since the vector representative of the Z signal (not shown) is nearly in phase opposition to he vector representative of the B–Y signal produced at plate 68, and since the vector representative of the X signal (not shown) is nearly in phase opposition with vector representative of the R–Y signal produced at plate 28, the angle between the vector representative of the G–Y signal and the vector representative of the X signal is smaller than the angle between the vector representative of the G–Y signal and the vector representative of the Z signal. As a result the largest contribution to the G–Y signal is from the X signal supplied to grid 30 of R–Y amplifier 24. After inversion and amplification in R–Y amplifier 24, this signal is supplied to grid 58 of G–Y amplifier 50 via a voltage divider network.

Figure 4:
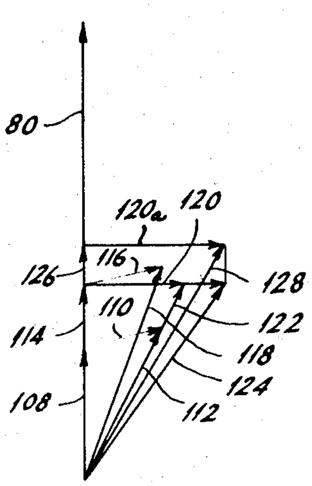
FIG. 4 is a vector diagram used to explain the operation of the circuit of FIG. 2.

In the aforementioned prior art color matrix circuit (i.e. one in which resistors 48, 51 and 62, and diodes 42, 44, and 46 are replaced by respective short circuits, and the voltage divider from terminal 52 to plate 28 consists of resistors 38 and 40), the following operation occurs: Signal from plate 28 is supplied to grid 58 of G–Y amplifier 50 from the junction of resistors 38 and 40. That supplied signal is represented in FIG. 4 by vector 108. Vector 80 represents the R–Y signal as in FIG. 3. An even smaller signal, represented by vector 110, is supplied to the cathode 60 of G–Y amplifier 50 from the R–Y and B–Y amplifiers via common cathode resistor 34. This vector is the resultant of vectors representative of components of the R–Y and B–Y signal currents flowing in cathode resistor 34. The voltage between grid 58 and cathode 60 is represented by vector 112. The G–Y signal, developed at plate 56, is in phase opposition to the signal represented by vector 112. Vector 84 in FIG. 3 represents that G–Y signal.

When the G–Y signal is so generated, and simultaneously R–Y and B–Y signals whose respective vectors intersect at an angle greater than 90° also are produced, the color reproduction is distorted in the green and cyan regions as already explained. This undesired distortion may be minimized by increasing the amount of signal supplied from plate 28 of R–Y amplifier 24 to grid 58 of G–Y amplifier 50. This can be done by increasing the ratio of the resistance of resistor 40 to that of resistor 38. In FIG. 4 this increased-amplitude signal is represented by vector 114. Since the cathode coupling is not changed, the signal developed across resistor 34 remains unchanged. Accordingly vector 116, representative of the latter cathode signal, is the same as vector 110, and the vector representative of the grid-to-cathode voltage of tube 50 is now vector 118, the vector sum of vectors 114 and 116. Vector 118 is longer than vector 112 and is more nearly in phase with R–Y vector 80 than is vector 112. As a result the flesh tones reproduced in response to the larger G–Y signal are more pink, and the yellows more orange, than before.

To offset this undesirable shift in colors, the gain of the Z demodulator is increased with respect to that of the X demodulator and, in accordance with the invention, resistor 48 is added between the cathodes of the R–Y and G–Y amplifiers, and resistor 62 is inserted in the cathode circuit of B–Y amplifier 64 to compensate for the increase in gain of the Z demodulator. These modifications have the effect of changing the voltage at the cathode of the G–Y amplifier from that represented by vector 116 to that represented by vector 120. Therefore the signal between grid 58 and cathode 60 of G–Y amplifier 50 now is represented by vector 122. Because the magnitude of the input signal to G–Y amplifier 50 is increased over that represented by vector 112, the cyans in the reproduced picture are less contaminated by blue, although they may still contain too much blue. The complete the correction of the cyans and greens, vector 120 may be made even longer by increasing the value of resistor 48. This increase causes vector 122 to rotate clockwise to position 124. This improves the reproduction of greens but tends to degrade yellows reproduction and causes some green to be added to the face tones because of the increased content of green light in the reproduced image. That change, produced by increasing the value of resistor 48, in the G–Y component of the voltage at cathode 60 is applied by resistor 62 to cathode 72 of B–Y amplifier 64. The resultant change in the grid-cathode voltage of tube 64 reduces the output of blue light by the picture tube, thereby reducing blue contamination of green images.

To achieve simultaneously faithful reproduction of greens and pleasing flesh tones, the proportion of signal at plate 28 supplied to grid 58 is made directly dependent on the amplitude of the R–Y signal, by inserting diodes 42, 44, and 46 in series with resistor 40. The diodes are connected in such polarity that an increase in the positive potential at plate 28 increases the resistances of diodes 42, 44 and 46, while a decrease in that positive potential decreases their respective resistances. When the diode resistances are relatively low, a smaller proportion of the output signal developed across resistor 26 is fed via capacitor 47 to grid 58 than when the diode resistances are high. Thus, when the amplitude of the R–Y signal is large in a positive sense (i.e. the voltage drop across resistor 26 is small and hence the plate voltage of tube 24 is near $V_b$), then a larger proportion of the (R–Y) signal is supplied to grid 58. This results in a larger-amplitude R–Y signal, represented in FIG. 4 by vector 126, being applied to grid 58. This larger signal increases negatively the amplitude of the G–Y output signal, thereby reducing the beam current of the green gun faster when the color is in the red or magenta region. The new G–Y signal is represented by vector 124 when the colors are in the green-cyan region and by vector 128 when the colors are in the red-magenta region. When the colors are in the yellow and blue regions, the vector representative of the signal applied to grid 56 is somewhere between the two vectors 124 and 128. Accordingly excessive green no longer appears in the yellows or flesh tones.

To avoid unpleasant flashes of color in the reproduced picture, caused for example by excessively large X signals reverse-biasing diodes 42, 44 and 46 so as effectively to cause the entire signal enveloped at plate 28 to be applied to grid 58, a resistor 51 is shunted across diodes 42, 44, and 46. This resistor assures that the portion of the voltage divider formed by the combination of diodes 42, 44, and 46 and resistor 51 always has a finite resistance and hence insures that the entire signal at plate 28 never is fed to grid 58.

From the foregoing it is apparent that a considerable improvement in the reproduced image is achievable by using only resistors 48 and 62, and even fuller compensation is achieved by also employing diodes 42, 44 and 46 and resistor 51.

Although the invention has been described with respect to an embodiment employing vacuum tubes, it is apparent that embodiments employing other active devices, e.g. bipolar or field effect transistors, also are feasible.

In addition although the matrix circuit of the invention has been described as supplying B–Y, R–Y and G–Y signals directly to the appropriate grids of a picture tube while the luminance signal is supplied to its cathodes, the output signals of the matrix circuit and the luminance signal may be combined in an adding circuit of well-known form to produce three signals representative of the red, green, blue and luminance components of the video signal. Those three signals then may be used to control the intensities of the beams of the three electron guns of the picture tube.

Furthermore although the embodiment of FIG. 2 contains three diodes 42, 44 and 46, other circuits according to the invention may contain only one or two diodes or more than three diodes. Increasing the number of diodes increases the dynamic range of variation in the ratio of resistances of the arms of the voltage divider.

I claim:

1. In a color television receiver adapted to receive a color television signal and develop therefrom X and Z signals, a matrix circuit adapted to accept X and Z signals and to produce output signals corresponding to R–Y, G–Y, and B–Y signals, said matrix circuit comprising:

first, second, and third amplifying means, each having a control electrode and first and second electrodes, wherein said R–Y signal appears at said second electrode of said first amplifying means, said G–Y signal appears at said second electrode of said second amplifying means, and said B–Y signal appears at said second electrode of said third amplifying means, resistive means for connecting each one of said second electrodes to a point at operating potential, means for applying said X signal to said control electrode of said first amplifying means, means for applying said Z signal to said control electrode of said third amplifying means, means for applying a portion of said R–Y signal to said control electrode of said second amplifying means, and resistive means connecting said first electrode of said first amplifying means to a point at reference potential, the improvement comprising:

means for adjusting the phase angle between said X and Z signals to a value larger than that necessary to provide faithful reproduction of said color television signal, resistive means connecting said first electrode of said second amplifying means to said first electrode of said first amplifying means, and resistive means connecting said first electrode of said third amplifying means to said first electrode of said second amplifying means.

2. A circuit according to claim 1 wherein said means for applying said portion of said R–Y signal to said control electrode of said second amplifying means comprises first and second resistive means connected in series relationship and in the order named between said second electrode of said first amplifying means and said point at operating potential, and capacitive means coupling the junction of said first and second resistive means to said control electrode of said second amplifying means.

3. A circuit according to claim 2 wherein said second resistive means comprises nonlinear means.

4. A circuit according to claim 2 wherein said second resistive means comprises a diode.

5. A circuit according to claim 2 wherein said second resistive means comprises resistive means connected in series with the parallel combination of at least one diode and additional resistive means.

6. A circuit according to claim 2 wherein each one of said first, second and third amplifying means comprises an electron discharge tube having a control grid, a cathode, and a plate, said control grid, said cathode, and said plate being respectively said control electrode, said first electrode, and said second electrode of said amplifying means.

PO-1050
(5/69)

UNITED STATES PATENT OFFICE
CERTIFICATE OF CORRECTION

Patent No. 3,613,105 Dated October 12, 1971

Inventor(s) Ernest C. Freeland

It is certified that error appears in the above-identified patent and that said Letters Patent are hereby corrected as shown below:

Column 1, first paragraph, 3rd line (line 6): before "cathode-ray", "he" should be --the--

Column 1, sixth and fifth lines from bottom of column (lines 70-71): "conveniently" should be --conventionally--

Column 2, line 6: after "load" the comma should be deleted and --resistor-- substituted therefor Column 2, line 10: after "44", "nd" should be --and--

Column 3, line 12: after "resistor", "nd" should be --and--

Column 3, penultimate paragraph, first line (line 52): "and" should be deleted and --representative-- substituted therefor Column 5, line 5: before "vector", --the-- should be inserted Column 5, tenth line from bottom of column (line 64): "The" should be changed to --To--

Signed and sealed this 6th day of June 1972.

(SEAL)
Attest:

EDWARD M.FLETCHER,JR.
Attesting Officer

ROBERT GOTTSCHALK
Commissioner of Patents